United States Patent [19]

Regruit

[11] Patent Number: 4,600,955
[45] Date of Patent: Jul. 15, 1986

[54] MEANS FOR STABILIZING MOVEMENT OF A FLEXIBLE DISK OVER A MAGNETIC HEAD

[75] Inventor: Curtis R. Regruit, Rochester, N.Y.

[73] Assignee: Eastman Kodak Company, Rochester, N.Y.

[21] Appl. No.: 547,554

[22] Filed: Oct. 31, 1983

[51] Int. Cl.[4] .................. G11B 5/016; G11B 15/64; G11B 21/08; G11B 17/32
[52] U.S. Cl. ..................... 360/99; 360/102; 360/106; 360/128; 360/130.34
[58] Field of Search .............. 360/130.34, 102–103, 360/97, 99, 104, 106, 86, 133, 122, 129, 128; 369/115

[56] References Cited

U.S. PATENT DOCUMENTS

| | | | |
|---|---|---|---|
| 3,178,719 | 4/1965 | Shapiro | 346/74 |
| 4,003,091 | 1/1977 | Wright | 360/102 |
| 4,074,330 | 2/1978 | Norton et al. | 360/102 |
| 4,466,032 | 8/1984 | Saito | 360/99 |

FOREIGN PATENT DOCUMENTS

54-17708 9/1979 Japan .................. 360/99

OTHER PUBLICATIONS

Slindee, "Burnishing Method & Apparatus for Flexible Magnetic Disks," *IBM Tech. Disc. Bull.*, v. 19, No. 10, Mar., 1977.

Carmichael et al., "Disk Drive for Interchangeable Disk Cartridges," *IBM Tech. Disc. Bull.*, v. 20, No. 11A, Apr., 1978.

Childers, "Disk Cartridge Players," *IBM Tech. Disc. Bull.*, v. 23, No. 4, Sep., 1980.

*Primary Examiner*—A. J. Heinz
*Assistant Examiner*—Benjamin Urcia
*Attorney, Agent, or Firm*—Roger A. Fields

[57] ABSTRACT

In a magnetic recording and/or reproducing apparatus, a flexible storage disk is rotated within a disk cartridge to move successive radial portions of the disk over an opening in the cartridge. The opening is disposed to provide limited radial access to the disk. A head-to-disk stabilizing assembly seals the opening, preferably at the exterior of the cartridge, to cause the formation of a Bernoulli pull down force on successive radial portions of the disk as each portion is rotated over the opening. Such pull down force momentarily deflects each portion of the rotated disk toward the opening, causing a deflected portion of the disk to remain substantially in contact with a magnetic recording or reproducing head movable along the opening, and thereby ensuring a stable head-to-disk relation.

6 Claims, 7 Drawing Figures

MEANS FOR STABILIZING MOVEMENT OF A FLEXIBLE DISK OVER A MAGNETIC HEAD

BACKGROUND OF THE INVENTION

1. Field of the Invention

The invention generally relates to a magnetic recording and/or reproducing apparatus for use with a magnetic disk cartridge. More particularly, the invention relates to apparatus that provides a stable, i.e., substantially constant, transducer-to-disk relation for enhancing the recording or reproducing of information signals on a flexible magnetic disk.

2. Description of the Prior Art

For successfully recording or reproducing information signals on a magnetic disk, particularly at high densities, there should be little or no spacing between the transducer and the disk. In addition, it is preferred that such transducer-to-disk relation remain substantially constant over a wide range of operating parameters. Unfortunately, especially with a magnetic disk that is flexible, as for example a floppy disk, the transducer-to-disk relation may be varied by the interaction of many parameters, such as temperature, humidity, relative speed between the disk and the transducer, contour of the transducer, penetration (dimpling) of the transducer into the disk, flexibility and variations in thickness of the disk, etc.

To ensure a substantially constant spacing between a flexible magnetic disk and a magnetic head, it has been proposed, as in U.S. Pat. No. 3,178,719, that the magnetic disk be rotated in close proximity to an annular stabilizing plate, sometimes referred to as a Bernoulli plate, which causes the rotating disk to assume a stable position at a small distance from the stabilizing plate. A plurality of magnetic heads, radially disposed with respect to the flexible disk, are embedded in the stabilizing plate, either slightly above or slightly below (e.g., 0.002") or flush with the top surface of the plate facing the disk. Presumably, the top surface of the plate and the magnetic heads are relatively arranged to allow the heads to penetrate into the flexible disk as the disk is rotated. Since the close spacing between the stabilizing plate and the rotated disk, and therefore the critical spacing between the magnetic heads and the rotated disk, varies as a function of the disk radius, a vacuum pump is included to create a partial vacuum in respective openings around each one of the heads. The partial vacuum deforms small areas of the flexible disk around the magnetic heads to independently control the close spacing between each one of the heads and localized portions of the disk.

Although the apparatus disclosed in U.S. Pat. No. 3,178,719 may perform satisfactorily, it requires the use of a vacuum pump to control the critical head-to-disk spacing, which increases the construction and operating costs of such apparatus. A simpler apparatus that dispenses with the need for a vacuum pump is disclosed in U.S. Pat. No. 4,074,330. In that apparatus, a stabilizing (Bernoulli type) plate has a groove which is sealed at its ends, is open to a flexible disk, and is radially disposed with respect to the disk. A magnetic head, movable along the groove, projects from the groove to penetrate into the flexible disk. Bracketing the groove, on either side of the head, is a pair of up-stream and down-stream air bearing arcuate surfaces which are radially coextensive with the groove. The respective apexes of the two air bearing surfaces are located closer to the top surface of the stabilizing plate facing the flexible disk, than to the radially extending sides of the groove. With this arrangement, it is purported that the amount of air carried by the rotated disk out of the groove is greater than the amount of air carried by such disk into the groove. The net result is to exhaust air from the groove, which generates a Bernoulli pull down force on the rotated disk over the groove. Such pull down force is opposite to the tendency of the rotated disk to dimple away from the magnetic head because of penetration of the head into the disk, and therefore ensures a stable close spacing between the head and the disk.

When a magnetic disk is housed permanently in a cartridge, the stability of the head-to-disk relation may be affected by certain surfaces of the cartridge proximate the rotated disk. One approach for ensuring a stable head-to-disk relation in a disk cartridge is disclosed in U.K. Patent Application GB No. 2,101,391A, published Jan. 12, 1983 and in *IEEE Transactions on Consumer Electronics*, Vol. CE-28, No. 3, August 1982, p. 326. In that example, the disk cartridge includes an opposed pair of openings which extend radially on either side of the magnetic disk. As the flexible disk is rotated, a magnetic head is moved along one of the openings, in the nominal plane of revolution of the disk, to penetrate the disk and a guide plate in the other opening limits the tendency of the rotated disk to lift off the magnetic head. Use of the guide plate reduces the head-to-disk spacing to about 0.07 microns. Without the guide plate, the head-to-disk relation may vary to the extent that the signal-to-noise ratio will be unacceptable.

SUMMARY OF THE INVENTION

The invention relates to a magnetic recording and/or reproducing apparatus, especially for use with a cartridge of the type (a) containing a flexible magnetic disk, such as a floppy disk, for storing information signals and (b) having an opening that provides limited radial access to the disk, and comprises:

means for rotating the disk over the opening;

a magnetic head movable within the opening, radially across the disk, for recording or reproducing information signals on the disk; and means for sealing the opening, with the head in the opening, to substantially prevent air from entering the opening from the exterior of the cartridge (though allowing air to be removed from the opening to the interior of the cartridge), whereby rotation of the disk over the opening can remove air from the opening to generate a Bernoulli pull down force on the disk toward the head.

According to the invention, therefore, a pull down force is effected which can provide a stable head-to-disk relation in a magnetic disk cartridge, for enhancing the recording or reproducing of information signals on the flexible disk. Moreover, this is accomplished in a relatively simple manner without the use of a vacuum pump, air bearing surfaces, or a guide plate as in the prior art, described above.

In a preferred embodiment of the invention, the magentic recording and/or reproducing apparatus comprises:

means for rotating the disk to move successive radial portions of the disk over the opening:

pull down means, engageable with the cartridge, for sealing the opening substantially at the exterior of the cartridge to induce a Bernoulli pull down force on successive radial portions of the disk as each portion is rotated over the opening, which causes each portion to be momentarily deflected toward the opening; and a magnetic head movable within the opening, radially with respect to each portion of the disk deflected toward the opening, for recording or reproducing information signals on the disk.

BRIEF DESCRIPTION OF THE DRAWINGS

The invention will be described with respect to the drawings, wherein.

DESCRIPTION OF THE PREFERRED EMBODIMENT

Before proceeding with a description of the preferred embodiment of the invention, it is well to first consider a magnetic disk cartridge with which the preferred embodiment may be used.

Magnetic Disk Cartridge

Figure 1:
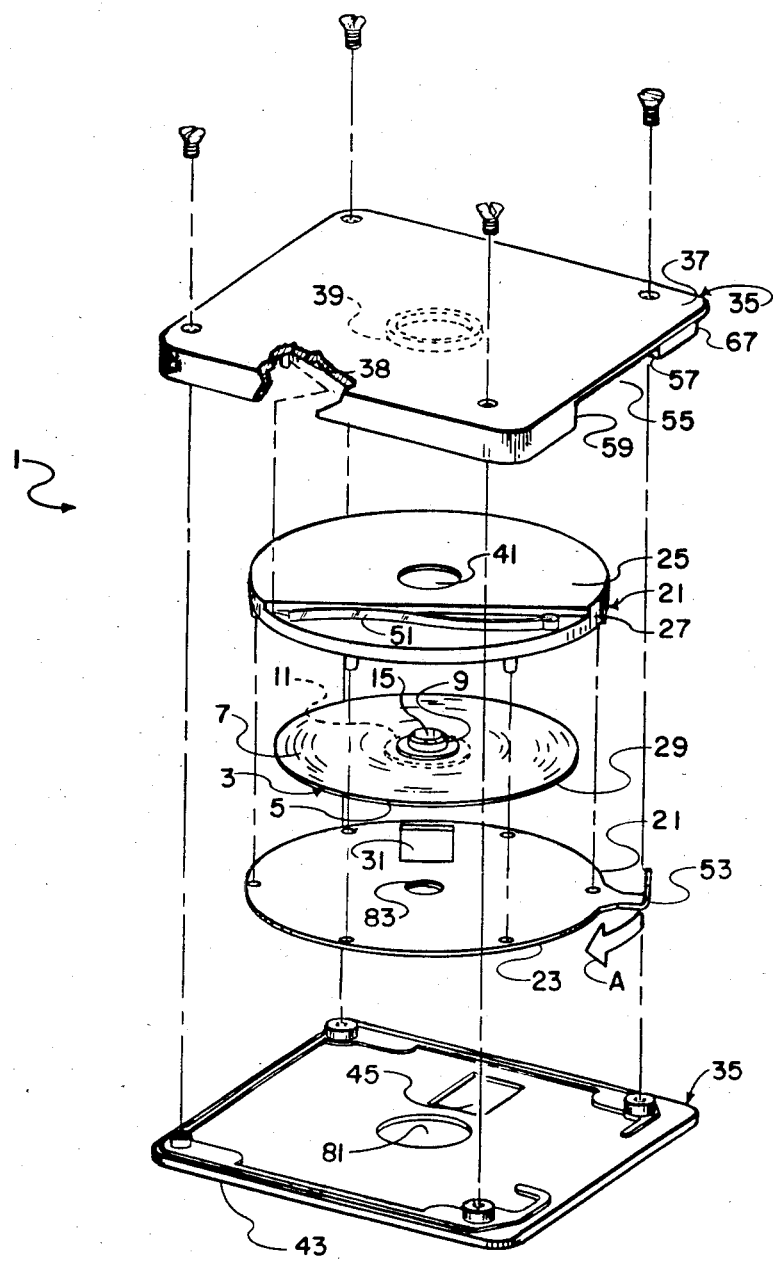
FIG. 1 is an exploded perspective view of a magnetic disk cartridge.
Figure 3:
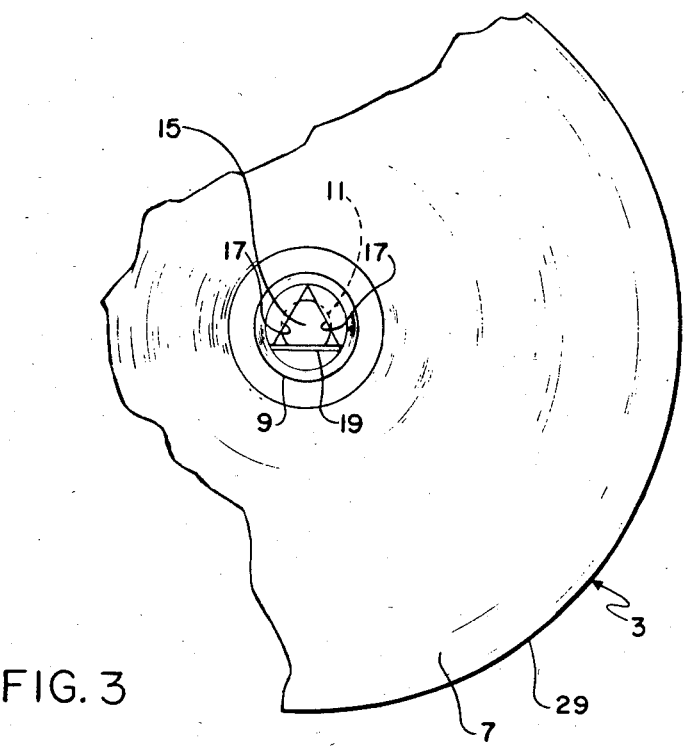
FIG. 3 is a plan view of the hub configuration of a flexible magnetic disk in the cartridge.
Figure 2:
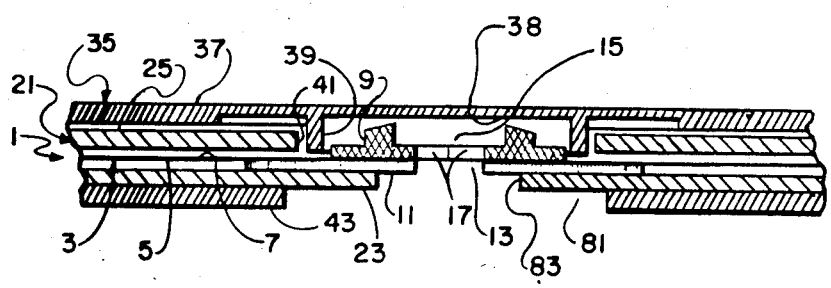
FIG. 2 is a partial sectional view of a central portion of the disk cartridge.

Referring now to the drawings, FIGS. 1 and 2 show a magnetic disk cartridge 1 intended for use in a disk recording and/or reproducing apparatus. The cartridge 1 includes a flexible disk 3 having a planar magnetic-coated surface 5, for storing information signals, and a planar non-magnetic support surface 7. A rotation hub 9 and an annular element 11, coaxially arranged with respect to a central hole 13 in the disk 3, are fixed to the respective support and magnetic surfaces 7 and 5 of the disk, as shown in FIG. 2. The hub 9 has a hole 15 for receiving a drive shaft in the recording and/or reproducing apparatus to rotate the disk 3. A pair of angled positioning edges 17, shown in FIG. 3, are arranged within the hole 15 in the hub 9 to tangentially contact the circular periphery of the drive shaft, for centering the disk 3 relative to the axis of the drive shaft. A resilient chordal element 19 extends across the hole 15, opposite the two angled positioning edges 17, to hold the drive shaft firmly against both of the positioning edges.

A rigid protective envelope 21 is provided to enclose the flexible disk 3 in a cylindrically-shaped chamber, though the envelope is dimensioned to allow the disk to freely rotate within the chamber. As shown in FIGS. 1 and 2, the envelope 21 includes a pair of substantially parallel, circular-shaped face walls 23 and 25, each having a similar size diameter which is slightly larger than the diameter of the disk 3. The two face walls 23 and 25 generally cover the respective magnetic and support surfaces 5 and 7 of the disk 3, but they are slightly spaced from such surfaces. A continuous side wall 27 of the envelope 21, encircling the circumferential edge 29 of the disk 3, connects the face walls 23 and 25, as shown in FIG. 1. The face wall 23 has a rectangular-shaped opening 31 which is arranged radially with respect to the disk 3 to provide limited radial access to the magnetic surface 5, for a magnetic head in the recording and/or reproducing apparatus. The access opening 31 radially extends lengthwise at least to separate locations opposite the inner and outer effective limits of the annular recording area on the magnetic surface 5.

A rigid rectangular-shaped housing 35 encloses the envelope 21 and is dimensioned to allow the envelope to rotate within the housing. As viewed in FIGS. 1 and 2, a top wall 37 of the housing 35 includes, on its inside surface 38, an integrally formed, centered, tubular-like member 39. The tubular-like member 39 extends into a central opening 41 in the face wall 25 of the envelope 21 to support the envelope for rotation relative to the housing 35 substantially about the same axis as that of the disk 3. The rotation hub 9 of the disk 3 is located within the tubular-like member 39 to loosely support the disk for rotation.

A bottom wall 43 of the housing 35, as viewed in FIG. 1, has a rectangular-shaped opening 45 which is normally out of registration with the access opening 31 in the face wall 23 of the envelope 21, in order to be closed by the face wall. The opening 45 corresponds substantially in size and arrangement to the opening 31. For example, the opening 45 is arranged radially with respect to the disk 3, in the same way that the opening 31 is radially arranged with respect to the disk. A return spring 51 has one end fixed to the face wall 25 of the envelope 21 and another end fixed to the inside surface 38 of the top wall 37 of the housing 35. A tab 53, integrally formed with the face wall 23 of the envelope 21, extends through a side slot 55 in the housing 35. The return spring 51 ordinarily maintains the opening 31 in the envelope 21 displaced from the opening 45 in the housing 35 by urging the envelope to rotate in a direction opposite to that indicated by the arrow A until the tab 53 is abutted against a stop 57 at one end of the side slot 55. When the tab 53 is moved in the direction of the arrow A until it abuts against a stop 59 at the other end of the side slot 55, the envelope 21 will be rotated in the same direction to position the opening 31 substantially in registration with the opening 45. Then, a magnetic head may be admitted through such pair of registered openings 31 and 45 to the magnetic surface 5 of the disk 3.

The cartridge 1 includes the envelope 21 within the housing 35 for twice enclosing the flexible disk 3 to prevent dust and other contaminants from reaching its sensitive magnetic surface 5, and to provide a rigid interior enclosure for the flexible disk, which supplements the rigid housing in protecting the fragile disk from being folded or otherwise damaged.

Magnetic Recording and/or Reproducing Apparatus

Figure 4:
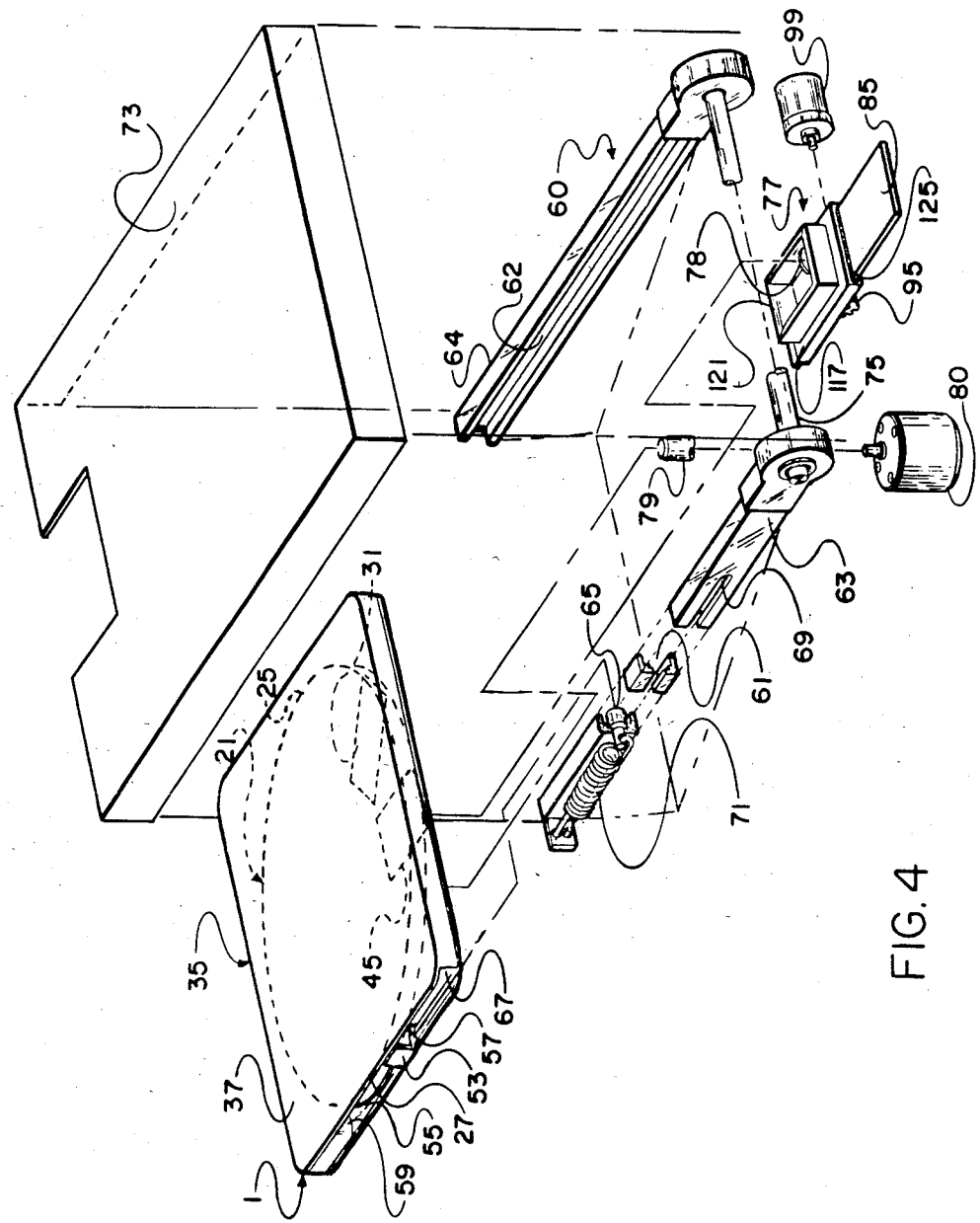
FIG. 4 is a schematic perspective view of the disk cartridge and a cartridge-loading assembly in a disk recording and/or reproducing apparatus.

FIG. 4 shows the manner in which the disk cartridge 1 may be inserted in a cartridge-loading assembly 60 of a disk recording and/or reproducing apparatus. When the cartridge 1 is slid into a pair of substantially parallel, u-shaped channels 61 and 62 defined by respective arms 63 and 64, a boss 65 located in the channel 61 will first enter a guide groove 67 in the housing 35 and will then swing the tab 53 along the side slot 55 in the housing from the stop 57 to the stop 59. Thereupon, the envelope 21 will be rotated relative to the housing 35 to position the opening 31 in the envelope substantially in registration with the opening 45 in the housing, to provide limited radial access to the magnetic surface 5 of the disk 3. With continued movement of the cartridge 1 into the channels 61 and 62, the tab 53 (against the stop 59) will depress the boss 65 along a support slot 69 in the arm 63 in opposition to the urging of a return spring 71. Then, upon completed movement of the cartridge 1 into the channels 61 and 62, releasable means, not shown, may be manually operated to secure the cartridge in place.

When an assembly cover 73 atop the arms 63 and 64 is pushed downward, as viewed in FIG. 4, with the cartridge 1 secured in place, the cover (as well as the arms and the cartridge) will pivot about a supporting rod 75 until the cartridge comes to rest in a horizontal position against stop means, not shown. As the cover 73 is pushed downward, a head-to-disk stabilizing unit 77, including a magnetic recording or reproducing head 78 movable radially with respect to the disk 3, will be received in the pair of registered openings 31 and 45, and a drive spindle 79 rotated by a motor 80 will be received in the hole 15 in the hub 9 of the disk. As shown in FIG. 1, the bottom wall 43 of the housing 35 and the face wall 23 of the envelope 21 have respective central openings 81 and 83 for admitting the drive spindle 79 into the hole 15 in the hub 9 to rotate the disk 3.

Figure 5:
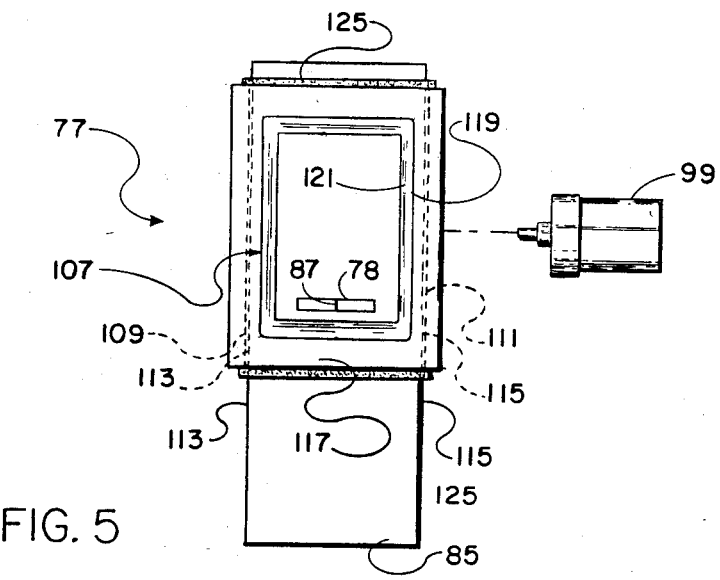
FIG. 5 is a top plan view of a head-to-disk stabilizing unit in the recording and/or reproducing apparatus, according to a preferred embodiment of the invention.
Figure 6:
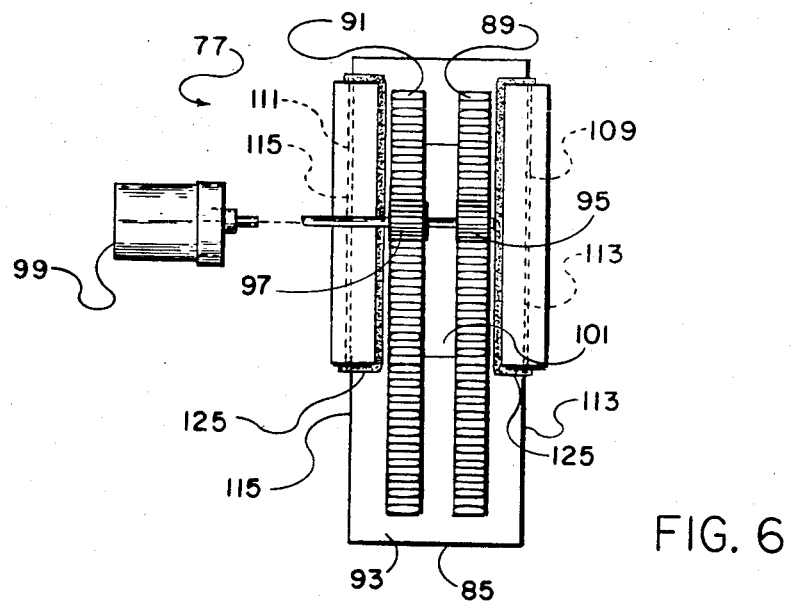
FIG. 6 is a bottom plan view of the head-to-disk stabilizing unit.
Figure 7:
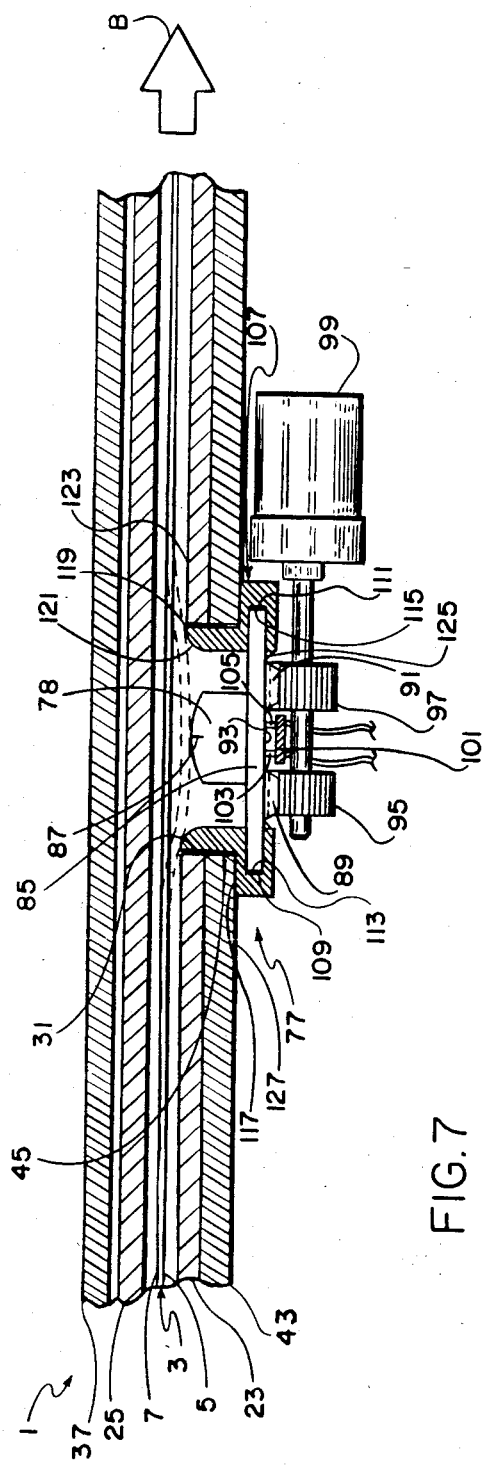
FIG. 7 is a sectional view of the stabilizing unit received in an access opening in the disk cartridge.

Details of the head-to-disk stabilizing unit 77 are shown in FIGS. 5, 6, and 7. Such unit includes a slide plate 85 on which the magnetic recording or reproducing head 78 is fixed in an upright position to allow a transducing tip 87 of the head to substantially contact the magnetic surface 5 of the rotated disk 3. A pair of spaced racks 89 and 91 on the undersurface 93 of the slide plate 85 are in mesh with respective pinions 95 and 97. The two pinions 95 and 97 are driven by a stepping motor 99 to radially move the magnetic head 78 over the magnetic surface 5 of the rotated disk 3. Electrical connections to the magnetic head 5 are made via a fixed conductive plate 101 on which ride a pair of head-contacts 103 and 105, as shown in FIG. 7. A rectangular-shaped positioning member 107, enclosing the sides of the magnetic head 78 in spaced relation, has a pair of grooves 109 and 111 in which respective longitudinal edges 113 and 115 of the slide plate 85 are supported to define the plane of radial movement of the magnetic head. The positioning member 107 has a continuous flat lip 117 which will abut against the bottom wall 43 of the cartridge housing 35, as shown in FIG. 7, to limit the extent to which the positioning member and the magnetic head 78 can be received in the pair of registered openings 31 and 45.

When the positioning member 107 is received with the magnetic head 78 in the pair of registered openings 31 and 45, as illustrated in FIG. 7, the apex 119 of a continuous arcuate edge 121 of the positioning member will be disposed flush with an upper surface 123 of the face wall 23 of the cartridge envelope 21. The positioning member 107 includes a continuous, flexible air-sealing gasket 125 which extends parallel to the continuous arcuate edge 121 at respective locations adjacent the two grooves 109 and 111 and between the separate ends of such grooves, as shown in FIGS. 5 and 6. This ensures that the positioning member 107 and the slide plate 85 will seal the pair of registered openings 31 and 45 proximate an outside surface 127 of the bottom wall 43 of the cartridge housing 35, to substantially prevent air from entering the openings at the exterior of the cartridge 1. Then, rotation of the disk 3 in the direction indicated by the arrow B in FIG. 7 at a relatively fast speed (e.g., 60 revolutions per second) over the pair of registered openings 31 and 45 will remove air from the openings, causing the formation of a negative pressure in the openings. Such pressure generates a Bernoullli pull down force on successive radial portions of the rotated disk as each portion is moved over the openings, which will cause each portion to be momentarily deflected from its nominal plane of revolution slightly into the opening 31, as shown by the broken lines in FIG. 6. Since the transducing tip 87 of the magnetic head 78 is located within the opening 31, below the apex 119 of the arcuate edge 121, the head-tip does not penetrate (dimple) into the rotated disk. Instead, localized portions of the rotated disk will be pulled substantially into contact with the head-tip, thereby ensuring a stable head-to-disk transducing relation.

According to the invention, therefore, a pull down force is effected which provides a stable head-to-disk relation in a magnetic disk cartridge, for enhancing the recording or reproducing of information signals on a flexible disk, without the use of a vacuum pump, air bearing surfaces, or a guide plate as in the prior art, described above.

While the invention has been described with reference to a preferred embodiment, it will be understood that various modifications may be effected within the ordinary skill in the art without departing from the scope of the invention. For example, the head-tip 87 may be disposed with respect to the apex 119 of the arcuate edge 121 to slightly penetrate into the rotated disk.

I claim:

1. In a magnetic recording and/or reproducing apparatus for use with a cartridge of the type (a) containing a flexible magnetic disk for storing information signals and (b) having an opening that provides limited radial access to the disk, the combination comprising:
   means for rotating the disk over the opening;
   a magnetic head for recording or reproducing information signals on the disk;
   means supporting said head for movement within the opening, radially across the disk; and
   means for sealing the opening, with said head in the opening, to substantially prevent air from entering the opening from the exterior of the cartridge, though allowing air to be removed from the opening to the interior of the cartridge, whereby rotation of the disk over the opening can remove air from the opening to generate a pull down force on the disk toward said head.

2. The combination as recited in claim 1, wherein said sealing means seals the opening along the exterior of the cartridge.

3. The combination as recited in claim 1, wherein said magnetic head has a tip for contacting the magnetic disk, and said supporting means supports said head with its tip located in the opening to allow the pull down force to deflect radial portions of the disk into the opening against said tip.

4. In a magnetic recording and/or reproducing apparatus for use with a cartridge of the type (a) containing a flexible magnetic disk for storing information signals and (b) having an opening that provides limited radial access to the disk, the combination comprising:
   means for rotating the disk to move successive radial portions of the disk over the opening;

pull down means, engageable with the cartridge, for sealing the opening substantially at the exterior of the cartridge to induce a pull down force on successive radial portions of the disk as each portion is rotated over the opening, to cause each portion to be momentarily deflected toward the opening;

a magnetic head for recording or reproducing information signals on the disk; and means supporting said head for movement within the opening, radially with respect to each portion of the disk deflected toward the opening.

5. The combination as recited in claim 4, wherein said supporting means supports said magnetic head in contact with each portion of the disk deflected into the opening.

6. The combination as recited in claim 4, wherein said pull down means includes means for overlapping the opening along the exterior of the cartridge to cause the opening to serve as a vacuum chamber as the disk is rotated over the opening.

* * * * *